(12) United States Patent
Akasaka (10) Patent No.: US 7,454,650 B2
(45) Date of Patent: Nov. 18, 2008

(54) MICROCONTROLLER HAVING A SYSTEM RESOURCE PRESCALER THEREON

(75) Inventor: Nobuhiko Akasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 782 days.

(21) Appl. No.: 10/790,016

(22) Filed: Mar. 2, 2004

(65) Prior Publication Data
US 2005/0080826 A1 Apr. 14, 2005

(30) Foreign Application Priority Data
Oct. 9, 2003 (JP) .............................. 2003-350380

(51) Int. Cl.
*G06F 1/10* (2006.01)
(52) U.S. Cl. ...................... 713/501; 713/322; 713/323; 713/600
(58) Field of Classification Search ................. 713/322, 713/323, 500, 501, 502, 600
See application file for complete search history.

(56) References Cited

U.S. PATENT DOCUMENTS 5,394,443 A * 2/1995 Byers et al. ................. 375/371

6,266,779 B1 * 7/2001 Kurd ......................... 713/500

FOREIGN PATENT DOCUMENTS

| JP | 02-067652 | 3/1990 |
|---|---|---|
| JP | 8-249082 | 9/1996 |
| JP | 2002-185310 | 6/2002 |
| JP | 2002-202829 | 7/2002 |

* cited by examiner

*Primary Examiner*—Mark Connolly
*Assistant Examiner*—Paul B Yanchus, III
(74) *Attorney, Agent, or Firm*—Staas & Halsey LLP (57) ABSTRACT

A microcontroller operating in synchronization with clock includes: an arithmetic unit operating in synchronization with the clock; an internal resource being connected to the arithmetic unit via a bus, and having at least a bus interface, and an internal circuit operating in synchronization with the clock; and a system resource prescaler which generates from the clock an operation permission signal denoting an operation permission state in m cycles out of n cycles of the clock (m=<n), and supplies the operation permission signal to the internal circuit of the internal resource. The above-mentioned internal circuit operates in synchronization with the clock when the operation permission signal denotes the operation permission state.

12 Claims, 10 Drawing Sheets

Denominator/Numerator Setting Register 60, 62

| 7 | 6 | 5 | 4 | 3 | 2 | 1 | 0 |
|---|---|---|---|---|---|---|---|
| Nume3 | Nume2 | Nume1 | Nume0 | Denom3 | Denom2 | Denom1 | Denom0 |
| R/W | R/W | R/W | R/W | R/W | R/W | R/W | R/W |

Initial Data 00000000
R/W

Operation Control Register 64

| 7 | 6 | 5 | 4 | 3 | 2 | 1 | 0 |
|---|---|---|---|---|---|---|---|
| – | – | – | – | – | – | – | Run |
|   |   |   |   |   |   |   | R/W |

Initial Data 00000000
R/W

FIG. 7B

Decision Table of Condition Decision Circuit  3/8

| n−1 \ m−1 | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | – | 0-1 | 0-1 | 0,2 | 0,2 | 0,3 | 0,3 | 0,4 |
| 2 | – | – | 0-2 | 0-2 | 0,1,3 | 0,2,4 | 0,2,5 | 0,2,5 |
| 3 | – | – | – | 0-3 | 0-3 | 0,1,3,4 | 0,1,3,5 | 0,1,2,4,6 |
| 4 | – | – | – | – | 0-4 | 0-4 | 0,1,2,4,5 | 0,1,2,4,5,6 |
| 5 | – | – | – | – | – | 0-5 | 0-5 | 0-6 |
| 6 | – | – | – | – | – | – | 0-6 | 0-6 |
| 7 | – | – | – | – | – | – | – | 0-7 |

MICROCONTROLLER HAVING A SYSTEM RESOURCE PRESCALER THEREON

CROSS-REFERENCE TO RELATED APPLICATIONS

This application is based upon and claims the benefit of priority from the prior Japanese Patent Application No. 2003-350380, filed on Oct. 9, 2003, the entire contents of which are incorporated herein by reference.

FIELD OF THE INVENTION

The present invention relates to a microcontroller having an arithmetic unit and internal resources having predetermined functions, and more particularly a microcontroller enabling suppression of influence to resource operation even when a clock frequency supplied to the arithmetic unit is increased.

BACKGROUND OF THE INVENTION

The microcontroller has an arithmetic unit (or simply, CPU) and resources performing a variety of functions, and executes internal operation in synchronization with externally supplied clock. The resources performing a variety of functions exemplarily include a communication macro communicating with outside, and a pulse generation circuit generating pulses or clock signals at calculated or designated timing. The CPU controls resources by executing a predetermined program stored in a built-in memory and supplying control data to these resources. Each resource performs operation such as communication control and pulse generation, based on the control data, etc.

Figure 1:
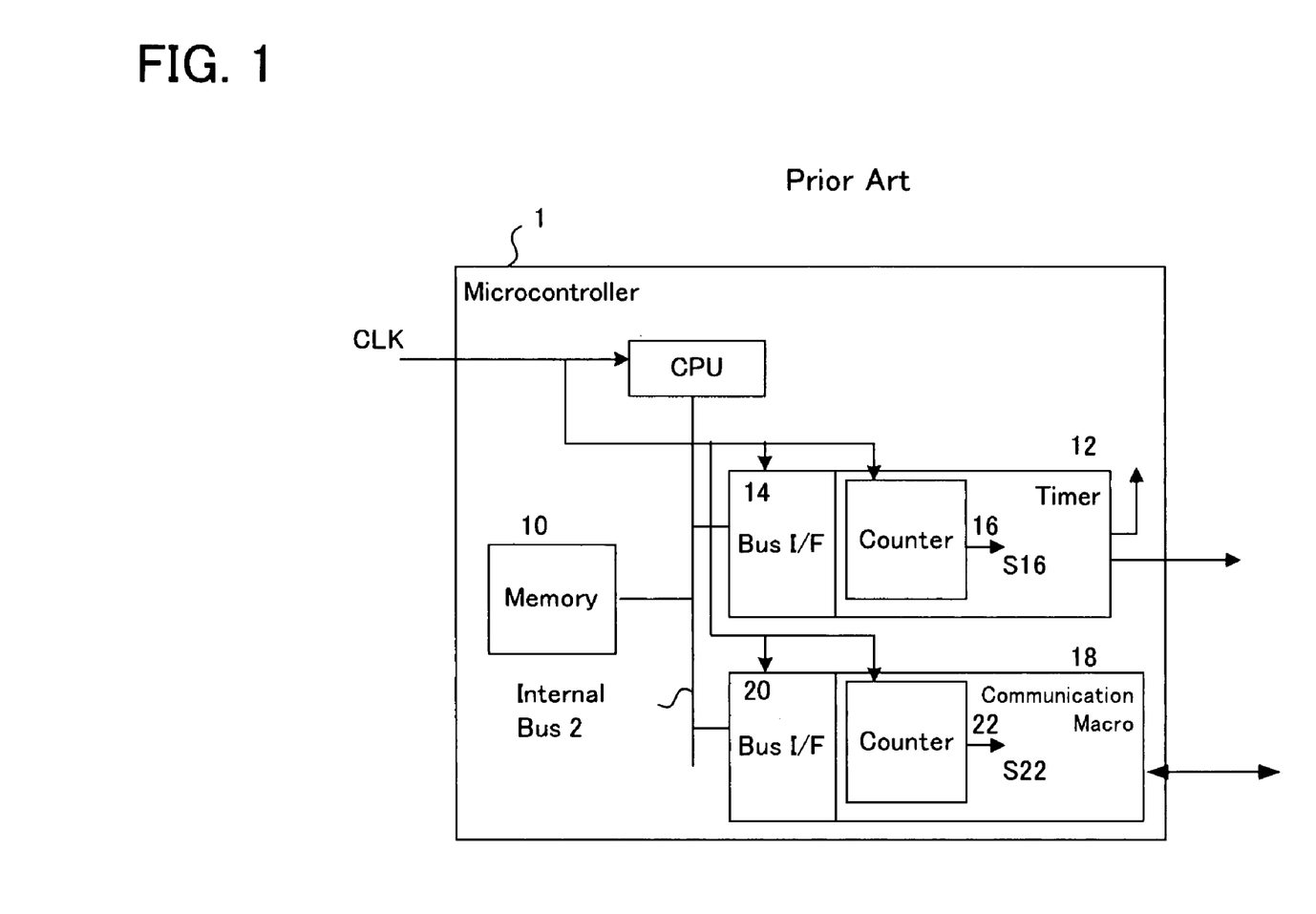
FIG. 1 shows a typical configuration diagram of the conventional microcontroller.

FIG. 1 shows a typical configuration diagram of the conventional microcontroller. A microcontroller 1 is provided with an arithmetic unit, i.e. CPU, a memory 10 having a program storage area and a temporary recording area, and internal resources including a pulse generation circuit such as a timer 12, a communication macro 18, etc. These internal resources are interconnected through an internal bus 2. Timer 12 includes at least a bus interface 14 interfacing internal bus 2, and a counter 16 generating pulses. Timer 12 is supplied with control data, etc. from the CPU, and outputs pulse S16 to internal or external circuits at predetermined timing counted by counter 16. Communication macro 18 is exemplarily provided with at least a bus interface 20 interfacing internal bus 2, and a counter 22 generating communication clock S22, to control input/output data communication from/to the outside.

Microcontroller 1 is supplied with clock CLK externally. The CPU and bus interfaces 14, 20 operate in synchronization with the same clock CLK. Also, counters 16, 22 perform count operation in synchronization with this clock CLK. For the purpose of bus control, it is necessary for bus initiator and target units to operate with the same clock, and bus interfaces 14, 20 are so structured as to operate in synchronization with the clock.

Such a microcontroller is exemplarily disclosed in a patent document 1 described later. This patent document 1 also discloses a method for reducing battery power consumption by decreasing an internal clock speed when a battery power voltage becomes low, with the provision of a rate multiplier/prescaler, thereby enabling a clock frequency to be variable corresponding to the battery source voltage.

As described above, in the microcontroller shown in FIG. 1, the CPU and the internal resources operate in synchronization with the externally supplied clock CLK. Here, it is required to increase a frequency of the supplied clock CLK to increase CPU processing capacity. By simply multiplying the frequency of the supplied clock CLK by N times, the CPU processing capability can be increased by N times. However, because counters 16, 22 in the internal resources 12, 18 operate in synchronization with the same supplied clock CLK, when the frequency of the supplied clock CLK is increased, control timing of the internal resources 12, 18 also becomes faster. This may impede proper control of units to be controlled by each internal resource. To avoid this, it becomes necessary to vary values to be loaded into counters 16, 22, increase the number of bits constituting the counters, etc. However, when the supplied clock CLK becomes still faster, the counter configuration in the internal resource have to be modified each time. To modify the internal resource configuration means modification of the microcontroller design, which causes a cost increase.

Figure 2:
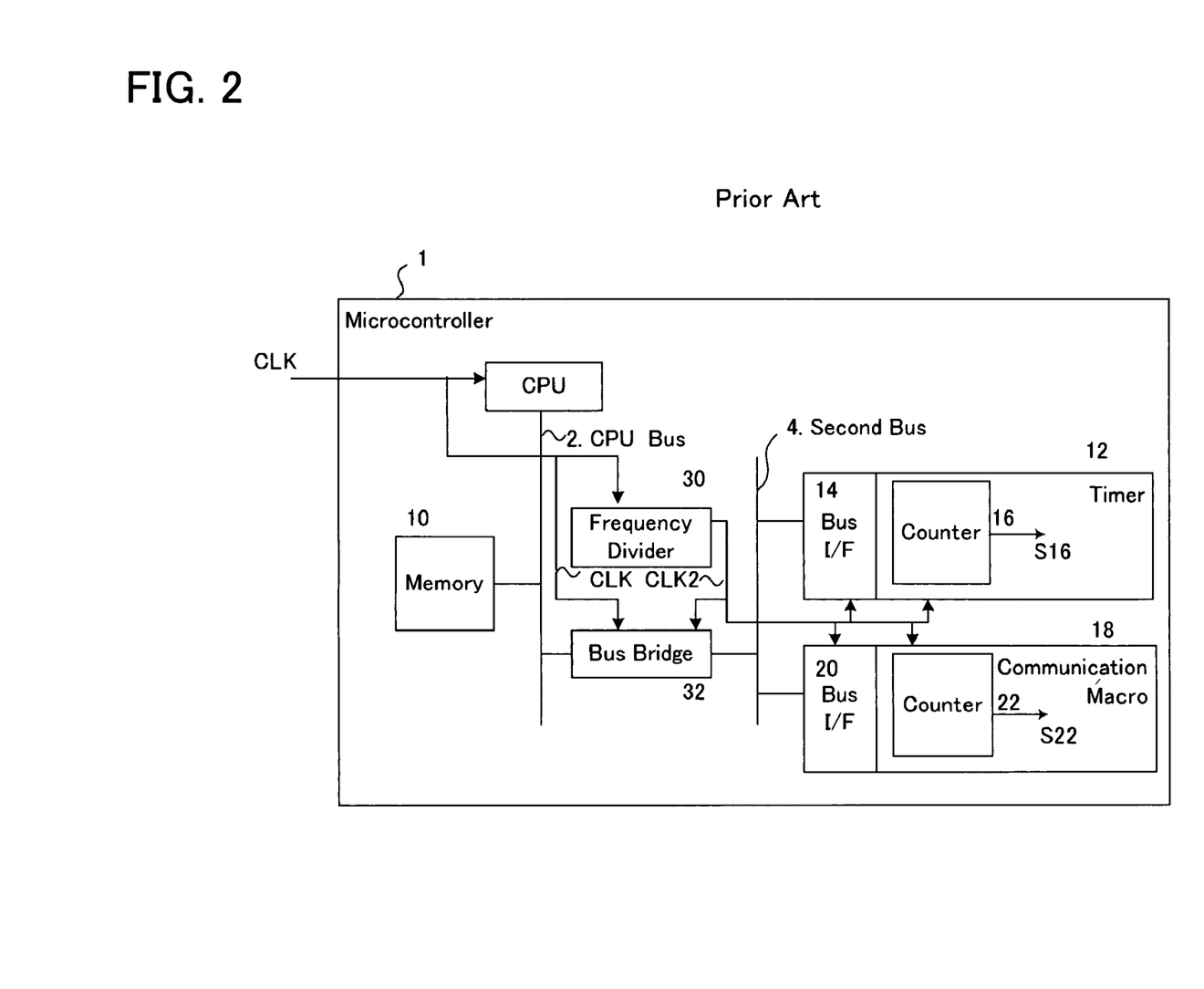
FIG. 2 shows a configuration diagram of the other conventional microcontroller.

FIG. 2 shows another configuration diagram of the conventional microcontroller. This microcontroller 1 is provided with a frequency divider 30 dividing the frequency of the clock CLK, by which a second clock CLK2 having a lower speed is generated. This low-speed second clock CLK2 is supplied to the internal resources 12, 18. With such a configuration, it becomes possible for the internal resources 12, 18 to operate synchronously with the clock CLK2 having the original speed, not the increased speed, even when the speed of the clock CLK is set higher in order to increase the CPU processing capability. Thus, control function with proper timing can be maintained.

In a patent document 2, as an example, a method of using the divided clock CLK as internal control clock is disclosed. In this patent document 2, there is disclosed a method of detecting a control clock speed generated by a CPU, and the clock, of which frequency is divided with a frequency division ratio corresponding to the detected speed, is supplied to an interruption control circuit, namely a resource. With such a configuration, an interruption control speed can be maintained constant, even when the CPU operation speed is increased by the increased clock speed.

[Patent document 1] The official gazette of the Japanese Unexamined Patent Publication No. 2002-202829 (published on 19th of Jul., 2002.)

[Patent document 2] The official gazette of the Japanese Unexamined Patent Publication No. Hei-8-249082. (published on 27th of Sep., 1996.)

SUMMARY OF THE INVENTION

It is an object of the present invention to provide a microcontroller capable of operating an internal resource at an original speed even when a CPU clock frequency is changed.

It is another object of the invention to provide a microcontroller having a CPU and an internal resource connected to a bus being operated at an identical frequency, while the internal resource is operated at a virtually different frequency.

In order to achieve the above-mentioned objects, according to one aspect of the present invention, a microcontroller operating in synchronization with clock includes: an arithmetic unit operating in synchronization with the clock; an internal resource being connected to the arithmetic unit via a bus, and having at least a bus interface, and an internal circuit operating in synchronization with the clock; and a system resource prescaler which generates from the clock an operation permission signal denoting an operation permission state in m cycles out of n cycles of the clock (m=<n), and supplies the operation permission signal to the internal circuit of the internal resource. The above-mentioned internal circuit operates in synchronization with the clock when the operation permission signal denotes the operation permission state.

In the aforementioned aspect, preferably, the system resource prescaler includes a register storing the values m and n, and the register can be set alterably.

Further, the system resource prescaler includes a settable operation control register indicative of either a first operation state in which the operation permission signal is set constantly to the operation permission state, or a second operation state in which the operation permission signal is set to the operation permission state in the m cycles out of the n cycles.

Still further, the system resource prescaler dispersively allocates the m cycles throughout the n cycles.

According to the above-mentioned solution means, the internal resource is structured so as to operate in synchronization with the clock. Here, when the clock is increased in speed, an operation speed of the internal resource is controlled by the operation permission signal supplied from the prescaler. Thus, the operation speed of the internal resource can be maintained, so as to correspond to the original clock speed.

Further scopes and features of the present invention will become more apparent by the following description of the embodiments with the accompanied drawings.

DETAILED DESCRIPTION OF THE PREFERRED EMBODIMENTS

The preferred embodiment of the present invention is described herein after referring to the charts and drawings. However, it is noted that the scope of the present invention is not limited to the embodiments described below, but instead embraces all equivalents to the claims described.

With such a configuration as shown in FIG. 2, it is necessary to separate CPU bus 2 connected to the CPU from a second bus 4 connected to the internal resources 12, 18. To enable this, it is necessary to provide a bus bridge 32 between the high-speed CPU bus 2 and the low-speed second bus 4, so as to absorb the difference of the operation frequencies between buses 2, 4. However, addition of such a bus bridge brings about a cost increase. Further, in general, frequency divider 30 generates the clock CLK2 having a cycle of a multiplication by a power of 2. When the internal clock CLK2 has a cycle of an integer multiplication of the cycle of the clock CLK, the edge timing of both clocks may possibly coincide, and therefore a timing match circuit in the bus bridge can be configured comparatively easily. In contrast, when a cycle having other than the multiplication of the power of 2 or other than the integer multiplication is required, the configuration of the frequency divider shown in FIG. 2 becomes complicated. In addition, when a cycle having other than the integer multiplication is required, the bus bridge configuration becomes complicated.

Figure 3:
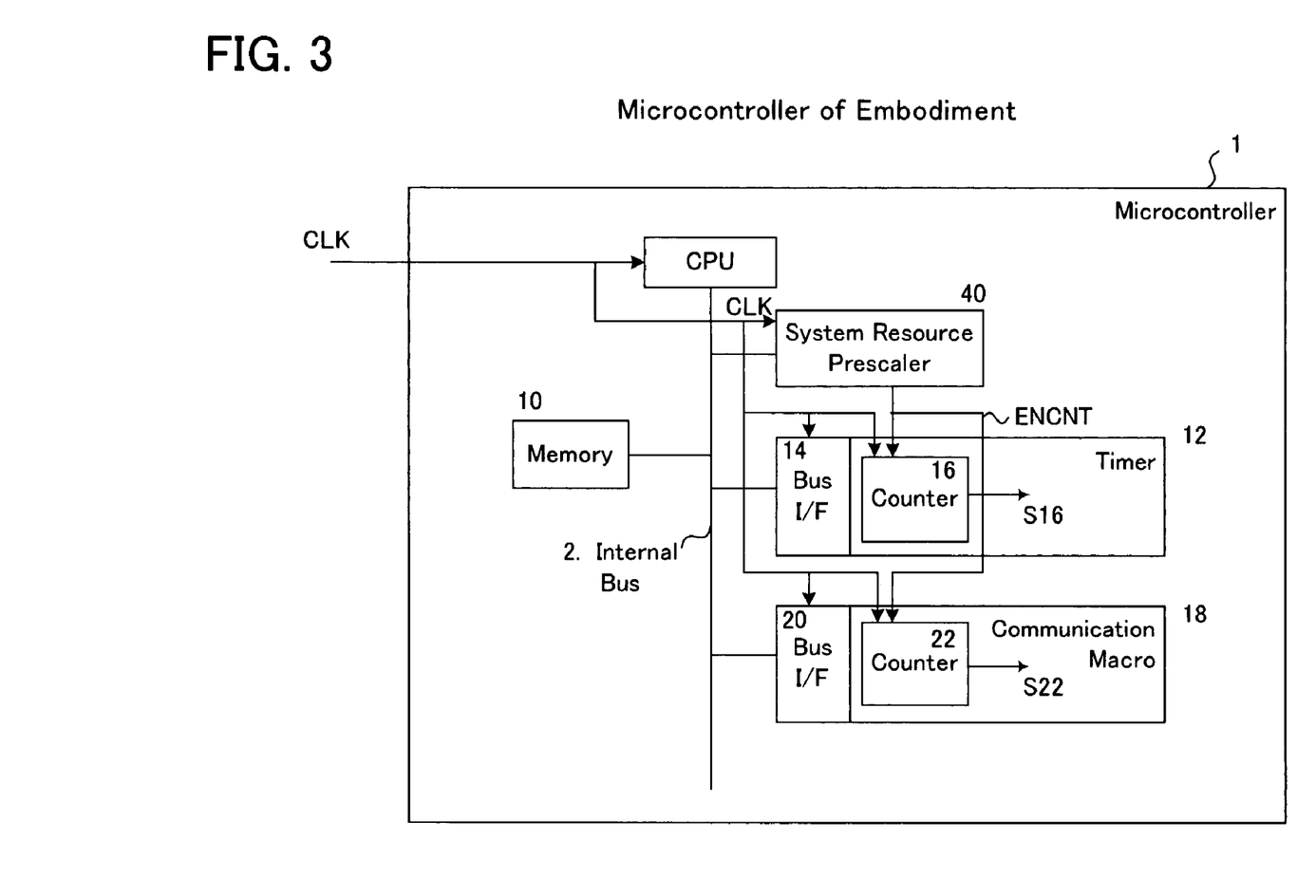
FIG. 3 shows a configuration diagram of the microcontroller in accordance with an embodiment of the present invention.

FIG. 3 shows a configuration diagram of a microcontroller according to an embodiment of the present invention. This microcontroller 1 includes a CPU, a memory 10, internal resources 12, 18, which are interconnected through an internal bus 2 in a similar manner to the conventional example. The internal resources exemplarily include a communication macro 18 and a pulse generation circuit (timer) 12. Clock CLK is supplied externally to microcontroller 1. This clock CLK is supplied to the CPU to control an operation speed and processing capability of the CPU. The clock CLK is also supplied to the resources, pulse generation circuit 12 and communication macro 18, of which interfaces 14, 20 perform bus management together with the CPU and memory 10 in synchronization with the clock CLK. Counters 16, 22 perform predetermined count operation also in synchronization with the clock CLK.

Therefore, when the frequency of the externally supplied clock CLK is increased, CPU processing speed is increased. In this case, the internal resources 12, 18 connected to the common internal bus can perform data transmission/reception to/from the CPU and the memory, through bus control synchronized with the clock CLK. Meanwhile, counters 16, 22, which are internal circuits in the internal resources 12, 18, operate in synchronization with the clock CLK. Therefore, with the frequency of the clock CLK being changed, undesirable change of the operation speed occurs in each counter. In order to avoid the above problem, a system resource prescaler 40 is provided according to the embodiment of the present invention. System resource prescaler 40 provides an operation permission signal ENCNT to counters 16, 22, so as to control each operation time period of counters 16, 22. Counters 16, 22 perform the count operation in synchronization with the clock CLK only during the operation permission signal ENCNT denoting an operation permission state. With this control of the operation time period, even though the frequency of the clock CLK is increased, the operation speed of counters 16, 22 in the resource is maintained in the same condition as performed at the clock frequency not increased. System resource prescaler 40 is connected to the CPU via internal bus 2, and configured to have a built-in register in which timing information for generating the operation permission signal is settable, as described later. Based on the timing information set in this register, the system resource prescaler 40 generates the operation permission signal ENCNT in synchronization with the clock CLK.

Figure 4:
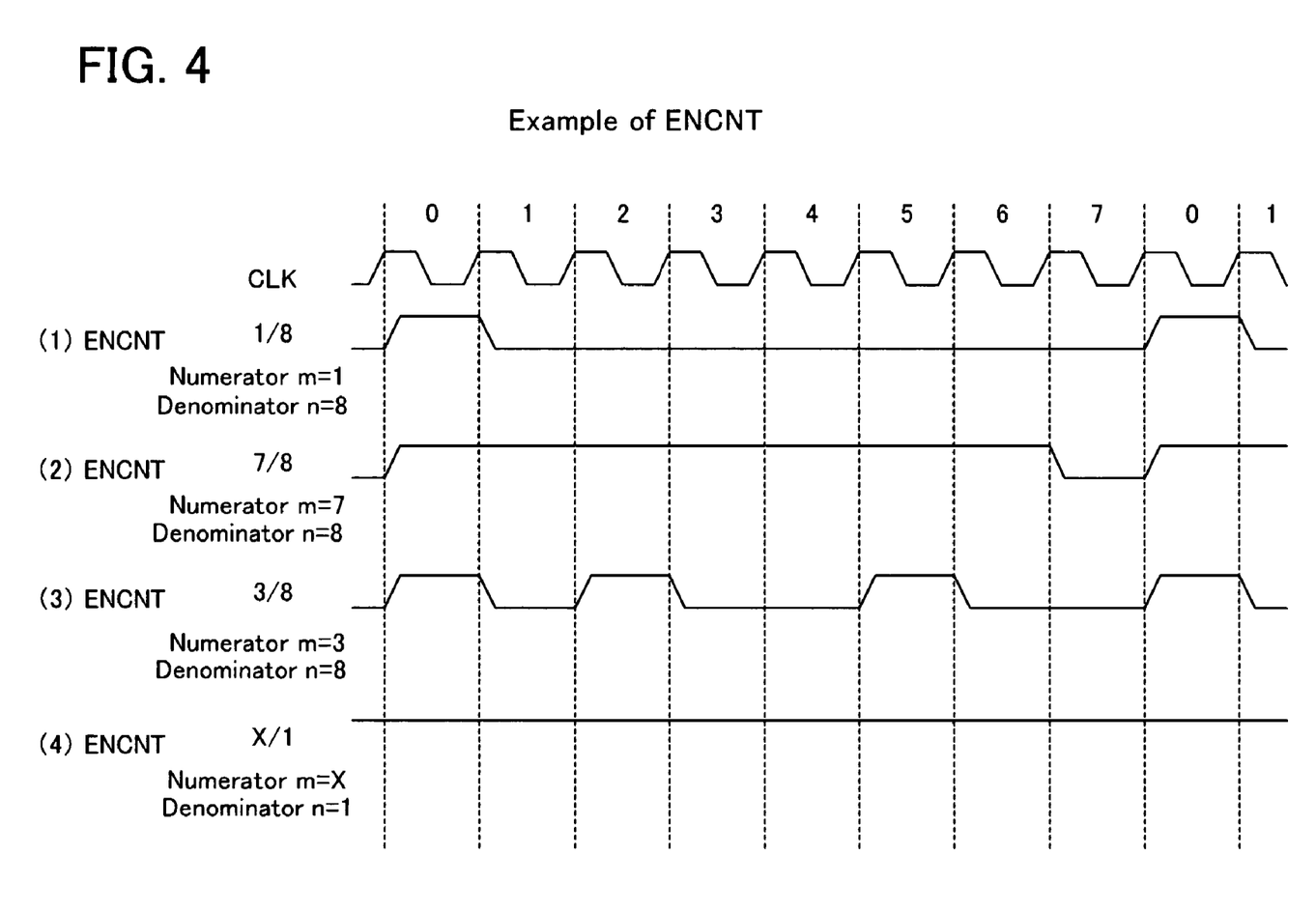
FIG. 4 shows an operation timing chart of a system resource prescaler.

FIG. 4 shows an operation timing chart of the system resource prescaler. The system resource prescaler 40 generates the operation permission signal ENCNT indicative of an operation permission state in m cycles out of 8 (n) cycles (0-7) of the clock CLK. The m cycles of the operation permission state are allocated with intervals throughout the n cycles in a dispersed manner to the maximum extent. With such dispersion, the counter can be operated at a nearly constant speed, as nearly as possible. Namely, the system resource prescaler 40 generates the operation permission signal ENCNT having a lower speed than the clock CLK, and controls the internal circuit of the internal resource to operate at a lower speed.

In FIG. 4, in case of setting values n=8 and m=1 as shown in (1), the operation permission signal ENCNT is set to the H level only in the cycles when the count value of the clock CLK is 0, in which the H level denotes the operation permission state. Accordingly, counters 16, 22 perform the count operation at a speed of ⅛ of the clock CLK.

In the case of (2) in FIG. 4, where setting values are n=8 and m=7, the operation permission signal ENCNT is set to the H level denoting the operation permission state in seven (7) cycles, namely when the count values of the clock CLK are 0 to 6. On the other hand, the operation permission signal ENCNT is set to the L level, denoting the non-permission state, in one cycle when the count value of the clock CLK is 7. Accordingly, the counters perform the count operation at a speed of ⅞ of the clock CLK. In the case of (3) in FIG. 4, where setting values are n=8 and m=3, the operation permission signal ENCNT is set to the H level, indicative of the operation permission state, in three (3) cycles when the count values of the clock CLK are 0, 2 and 5. Accordingly, the counters perform the count operation at a speed of ⅜ of the clock CLK. More specifically, the operation permission signal denotes the operation permission state in the 3 cycles out of the 8 cycles of the clock CLK. The operation permission states are dispersively distributed, so as to produce the operation timing as uniformly as possible. With this, the counter operation speed is controlled to obtain constant operation to the maximum extent. In the case of (4) in FIG. 4, the operation permission signal ENCNT is constantly set to the H level. Therefore, the counters perform the count operation synchronously with, and at the same speed as, the clock CLK.

As such, in the microcontroller according to the embodiment of the present invention, the operation states denoted by the operation permission signals are set in a register of prescaler 40 correspondingly to the frequency of the clock CLK. The operation permission signal ENCNT generated correspondingly to the setting information in the register is supplied to the counters 16, 22, namely the internal circuits of the internal resource. The counters 16, 22, perform the count operation in synchronization with the clock CLK only in the cycles in which the operation permission signal ENCNT denotes the operation permission state. Therefore, the counter configuration is designed so that the counter 16, 22, performs the count operation in synchronization with the clock CLK in any case, and the count operation is controlled to be effective only when the operation permission signal ENCNT denotes the operation permission state. In this manner, the operation speed of the counter 16, 22, is variably controlled, independently of the clock CLK, by the system resource prescaler 40.

Figure 5A:
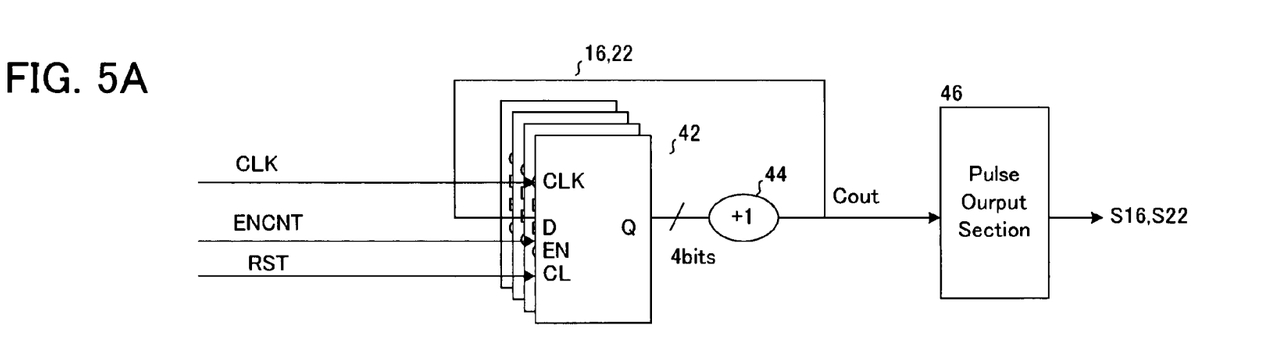
FIG. 5A shows a configuration diagram of a counter in an internal resource.
Figure 5B:
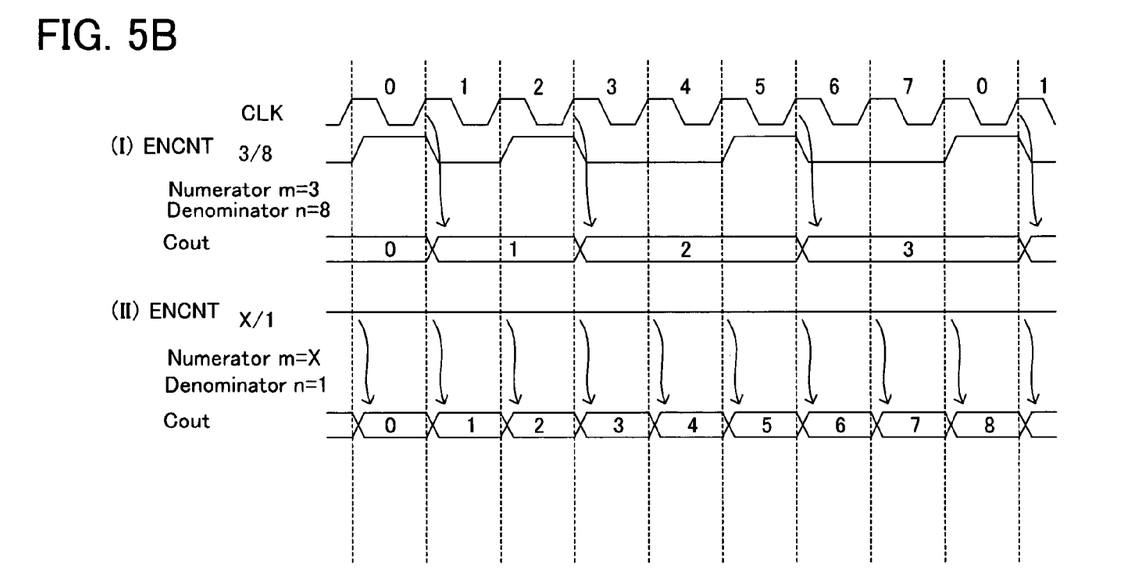
FIG. 5B shows an operation timing chart of a counter.

FIGS. 5A, 5B show a configuration diagram of the counter provided in the resource, and an operation timing chart of this counter, respectively. Counters 16, 22 are structured of a four-bit counter, having four flip-flops 42 and an increment circuit 44. The four flip-flops 42 has a data input terminal D and a data output terminal Q, latches the data input D synchronously with a rise edge of the clock CLK, and clears the latch condition in response to a rise edge of a reset signal RST. Also each flip-flop 42 provides an enable terminal EN, so as to perform latch operation in synchronization with the clock only when the operation permission signal ENCNT denotes the operation permission state (H level). Also, increment circuit 44 increments a supplied four-bit data by one, and outputs the incremented data. This output is feedbacked and input to the four flip-flops 42. Accordingly, during the operation permission signal ENCNT denoting the operation permission state, each flip-flop 42 latches the incremented data in synchronization with the clock CLK. This count value Cout is supplied to, for example, a pulse output section 46. This pulse output section 46 outputs pulses, or clock signals S16, S22 when the count value Cout has a predetermined value.

In FIG. 5B, there are shown counter outputs in two states. In a state (I), n=8, m=3 are set in the prescaler 40, and the operation permission signal ENCNT becomes the H level in the cycles when the counter values of the clock CLK are 0, 2 and 5. During these operation permission states, each flip-flop 42 latches the input data in synchronization with the clock CLK. With this latch, the increment circuit 44 increments the counter value by one. Accordingly, the counter output Cout is incremented only three times during the 8 cycles of the clock CLK, and thus the counter virtually performs the count operation at a period of ⅜ of the clock CLK. On the other hand, in the case of a state (II), the operation permission signal ENCNT is constantly set to the operation permission state. Accordingly, the counter is counted up synchronously with the clock CLK. Therefore, the counter output Cout is counted up 8 times during the 8 cycles of the clock CLK.

Figure 6:
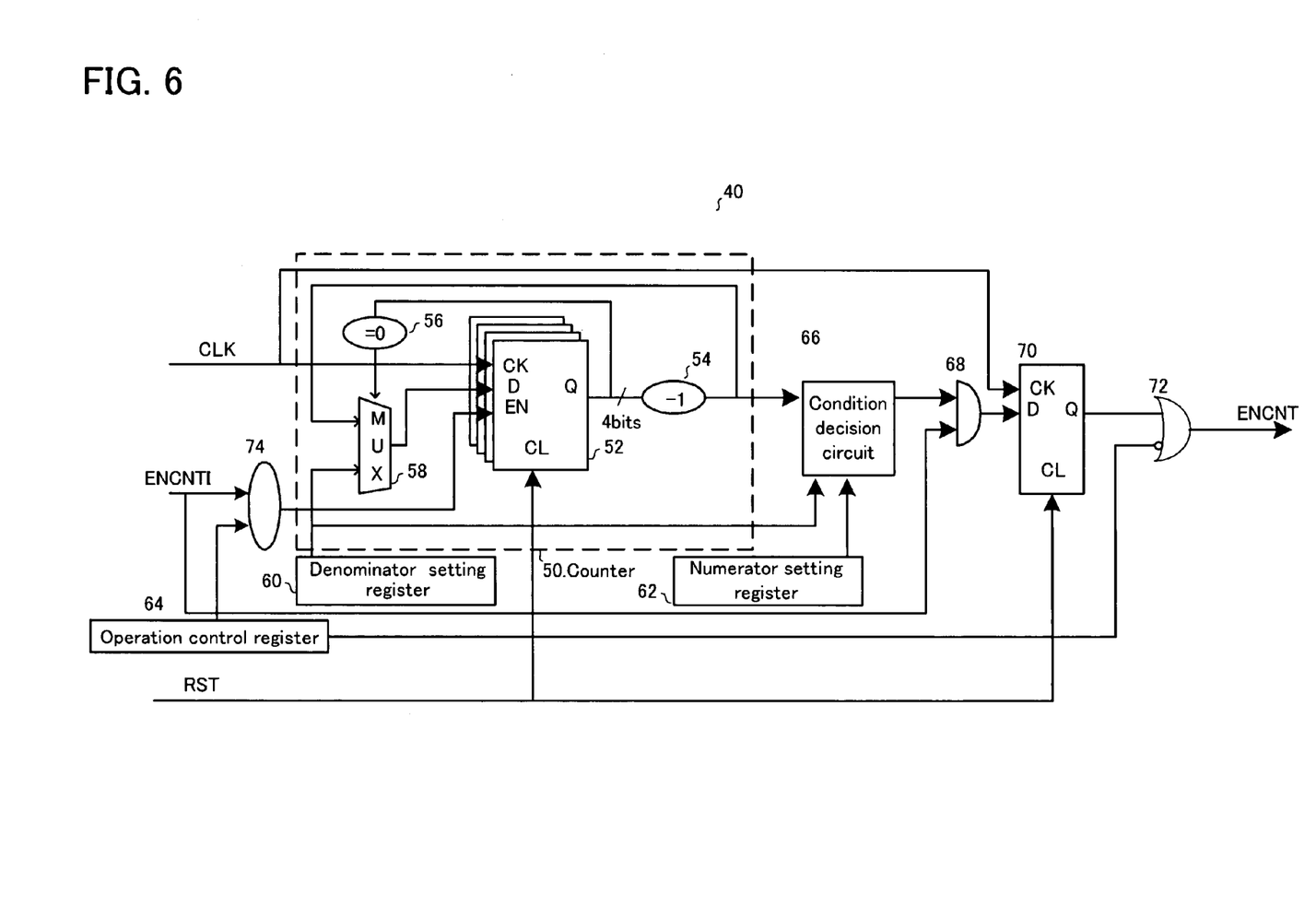
FIG. 6 shows a configuration diagram of a system resource prescaler according to an embodiment of the present invention.

FIG. 6 shows a configuration diagram of the system resource prescaler according to the embodiment of the present invention. The system resource prescaler 40 includes a counter 50. This counter 50 is a reloading type downcounter. A value n, which is set in a denominator setting register 60, is loaded as reloading value, and this reloading value n is counted down in synchronization with the clock CLK. To enable this function, counter 50 is exemplarily provided with four flip-flops 52, a decrement circuit 54, a multiplexer control circuit 56 which switches a multiplexer 58 to the denominator setting register 60 side when the output Q of the flip-flops becomes zero. With such a configuration, when the count value becomes zero, the value n stored in denominator setting register 60 is loaded onto flip-flops 52, and thereafter the counter is counted down in synchronization with the clock CLK. The value n is reloaded each time the counter value becomes zero. In such a way, counter 50 counts the cycles of the value n stored in the denominator setting register 60.

Now, a condition decision circuit 66 outputs the H level only for one cycle when the counter becomes a predetermined value, based on both the value n being set in denominator setting register 60 and a value m being set in a numerator setting register 62. An AND gate 68 passes the output of condition decision circuit 66 when the operation permission signal ENCNTI supplied from a preceding stage has the H level, and feeds this output to the data terminal D of a flip-flop 70. Meanwhile, while the operation permission signal ENCNTI supplied from the preceding stage stays in the L level, the data terminal D is maintained in the L level. Accordingly, flip-flop 70 latches the data input D in synchronization with the clock CLK, and outputs the operation permission signal ENCNT via an OR gate 72. In system resource prescaler 40 shown in FIG. 6, when the system resource prescaler 40 is used as either an independent prescaler or a fist-stage prescaler, the above-mentioned operation permission signal ENCNTI supplied from the preceding stage is constantly fixed to the H level.

Figure 7A:
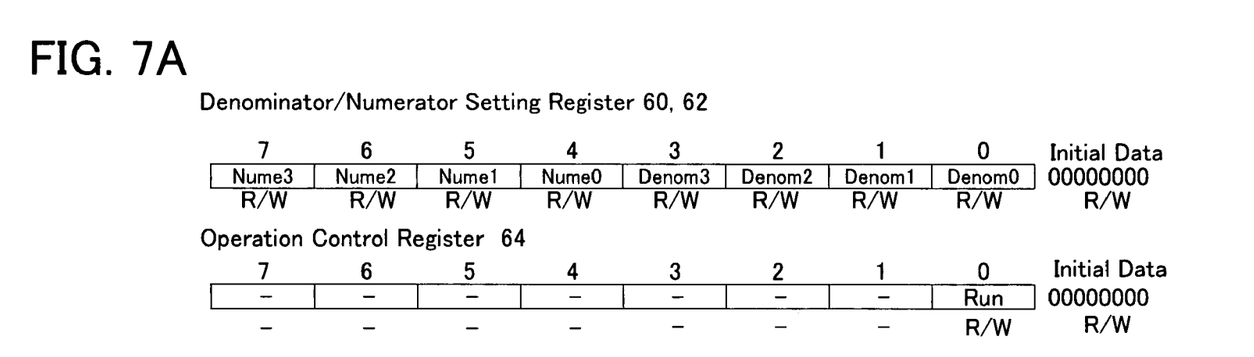
FIG. 7A shows a diagram illustrating registers in a system resource prescaler.
Figure 7B:
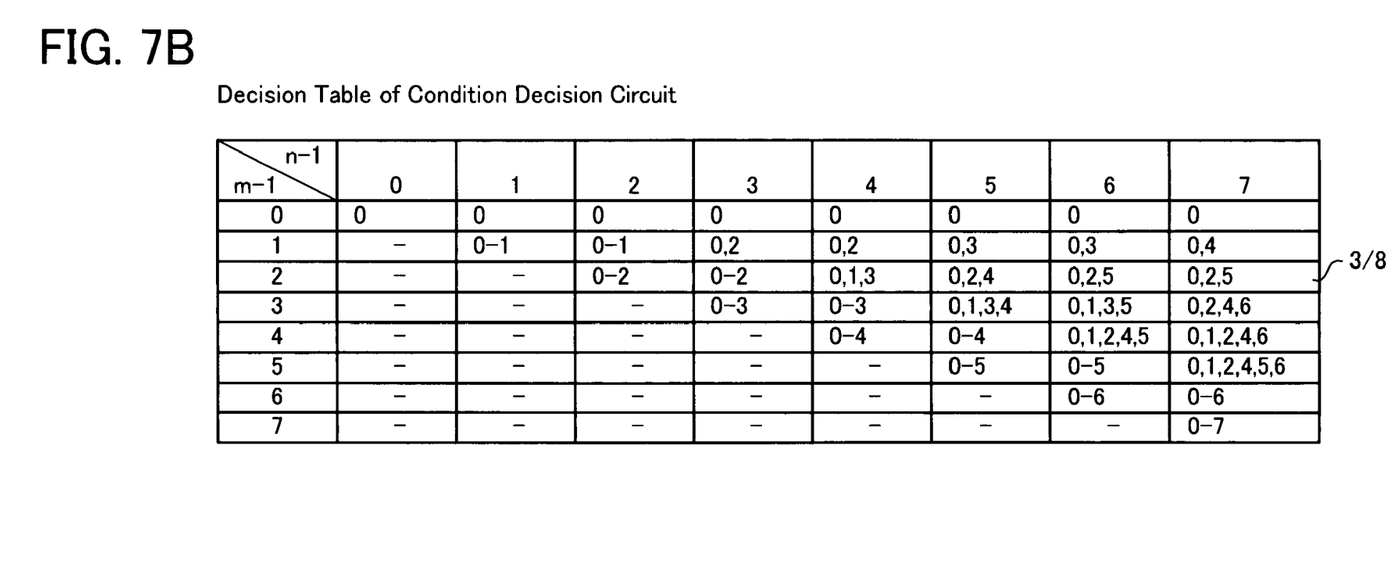
FIG. 7B shows a decision table in a condition decision section of a system resource prescaler.

FIGS. 7A, 7B show a diagram illustrating a register, and a decision table in a condition decision section of the prescaler, respectively. Denominator setting register 60 and numerator setting register 62 shown in FIG. 7A are incorporated in an 8-bit register. A denominator is set in bits 0-3, while a numerator is set in bits 4-7. Practically, a value 'n−1' is set for a denominator n, and a value 'm−1' is set in the register for a numerator m, respectively. Further, in an operation control register 64, a control value is set into #0 bit, which is referred to as Run bit. When the Run bit has a value '0', prescaler operation is suspended, and rewriting into the denominator/numerator setting registers 60, 62 becomes permitted. On the other hand, when the Run bit has a value '1', the prescaler operation is activated, and rewriting into the denominator/numerator setting registers 60, 62 becomes inhibited.

Referring back to FIG. 6, when the Run bit of operation control register 64 is '1', OR gate 72 passes the output Q of the flip-flop 70, and an operation permission signal ENCNT is output. When the Run bit of operation control register 64 is '0', the operation permission signal ENCNT is forcibly set to the H level. Namely, when '0' denoting the operation suspension is set to operation control register 64, the output operation permission signal ENCNT is constantly set to the H level, and accordingly the counter 16, 22, provided in the internal resource is constantly operated in synchronization with the clock CLK. On the other hand, when '1' denoting the operation state is set to operation control register 64, a pulse output from condition decision circuit 66 is output as operation permission signal ENCNT.

In order to control the operation of counter 50, an enable controller 74 is provided. When the Run bit of operation control register 64 is '0' denoting the operation suspension, an enable terminal EN of flip-flop 52 is set to the L level, and the operation of counter 50 is suspended. Meanwhile, when the Run bit of operation control register 64 is '1' denoting operation state, only in case the operation permission signal ENCNTI supplied from the preceding stage is in the H level, the enable terminal EN of flip-flop 52 is set to the H level, and accordingly, counter 50 performs the count operation. In other words, the counter operation is controlled corresponding to the operation permission signal ENCNTI supplied from the preceding stage.

FIG. 7B shows a decision table in the condition decision circuit. The columns show register values of the denominator n−1, while the rows show register values of the numerator m−1. In each cell, a counter value enabling the operation permission signal ENCNT to set to the H level is stored. For example, in the case of n=8 and m=3, at the time of the counter values 0, 2 and 5 stored in the cell in column #7 and row #2, condition decision circuit 66 outputs a pulse, so that the operation permission signal ENCNT becomes the H level. Thus, use of the decision table enables optimal setting of the dispersion condition of the operation permission state. Further, in this example of the decision table, when the denominator n is set to '1', the H level denoting the operation permission state is constantly output as operation permission signal ENCNT.

Figure 8:
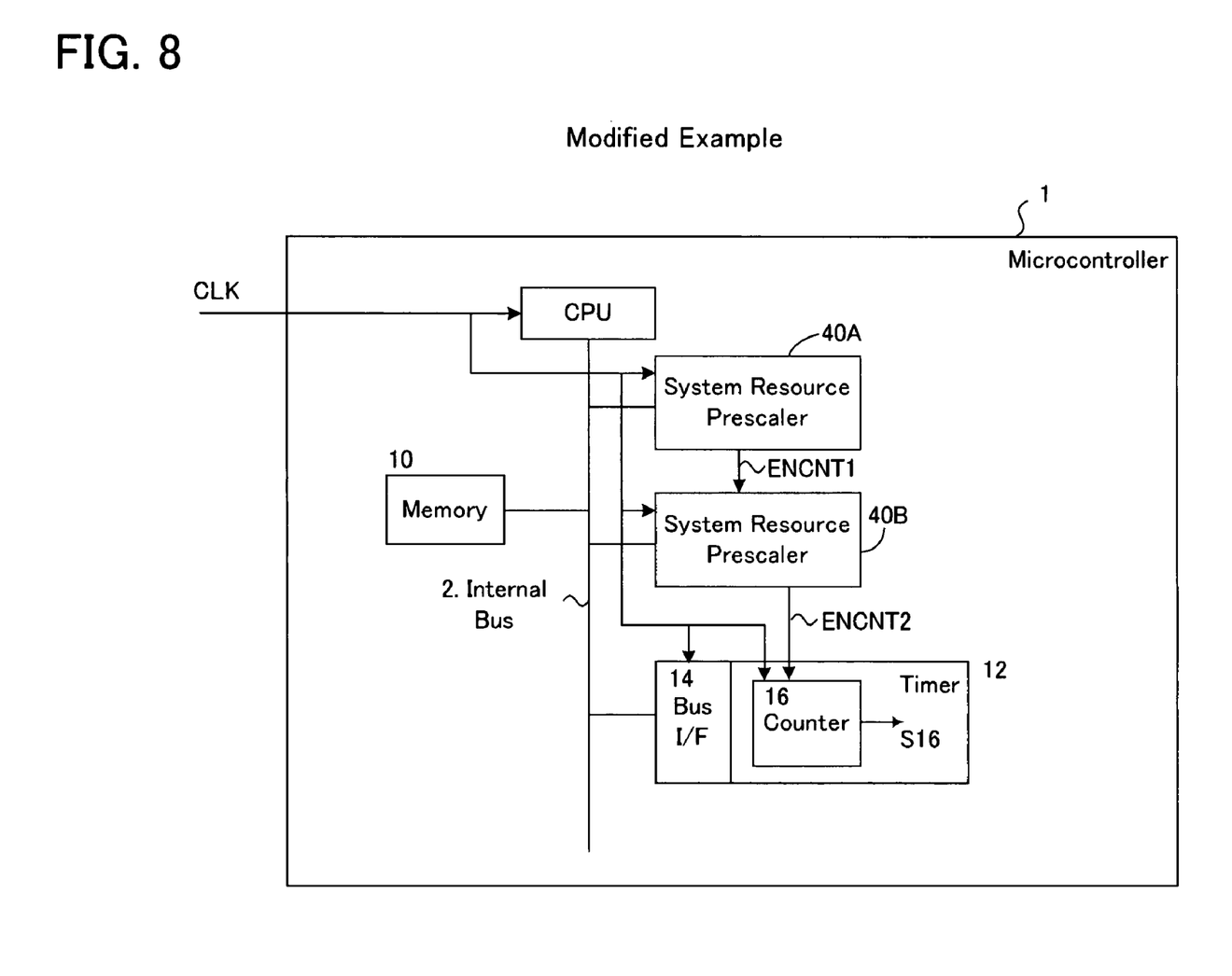
FIG. 8 shows a modified example of a microcontroller according to an embodiment.

FIG. 8 shows a diagram illustrating a modified example of a microcontroller according to the embodiment. In this example, the system resource prescaler is structured of two-stage system resource prescalers 40A, 40B. Prescaler 40A in the preceding stage generates an operation permission signal ENCNT1 according to the values n and m being set in a built-in register, and supplies this signal ENCNT1 to prescaler 40B in the succeeding stage as operation permission signal. Prescaler 40B in the succeeding stage is operated only when the operation permission signal ENCNT1 supplied from the preceding stage denotes the operation permission state. Prescaler 40B then generates an operation permission signal ENCNT2 according to the values n and m being set in a built-in register, and supplies the signal to counter 16 in the internal resource 12. By configuring the multi-stage prescaler, the operation speed of counter 16, which is an internal circuit of the internal resource, can be controlled with higher precision.

Figure 9:
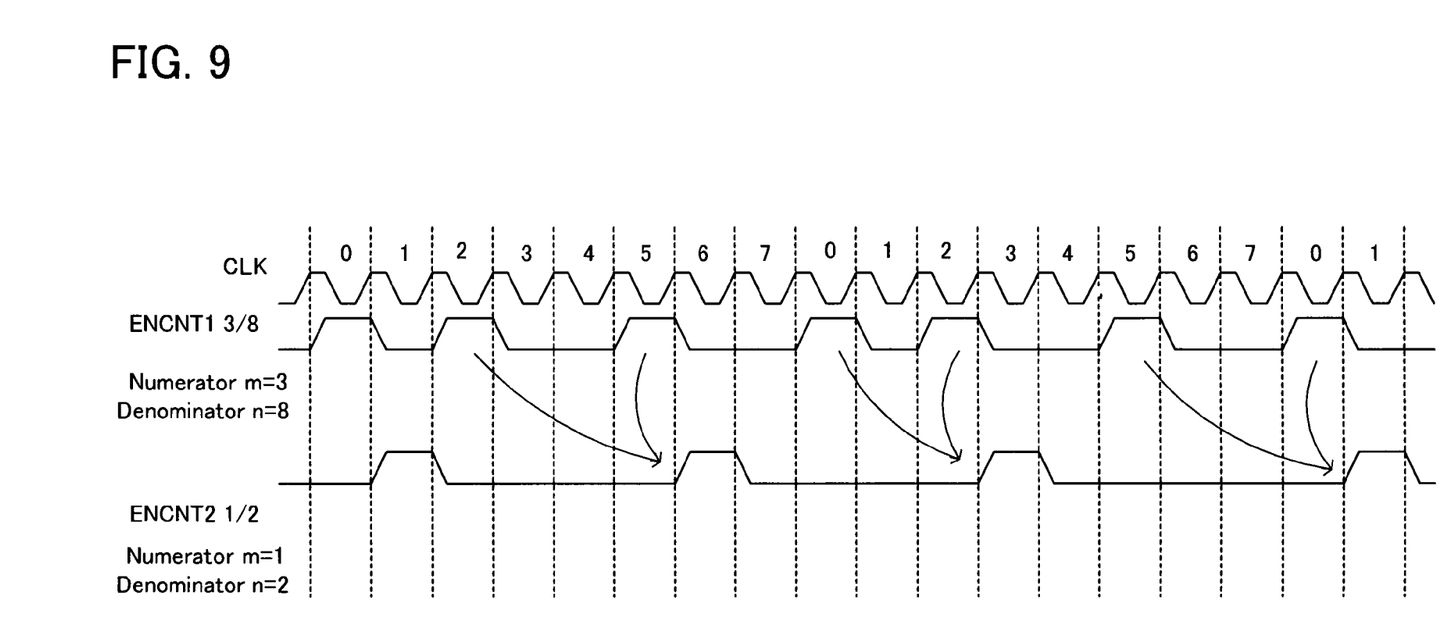
FIG. 9 shows an operation timing chart of a two-stage prescaler.

FIG. 9 shows an operation timing chart of the two-stage prescaler. In this example, n=8 and m=3 are set in the prescaler 40A of the preceding stage, and n=2 and m=1 are set in the prescaler 40B of the succeeding stage. Therefore, the operation permission signal ENCNT1 of the preceding stage becomes the H level in 3 cycles out of the 8 cycles. The operation permission signal ENCNT2 produced by the prescaler 40B in the succeeding stage becomes the H level in three cycles out of the sixteen cycles. Namely, counter 16 controlled by the operation permission signal ENCNT2 of the succeeding stage 40B is controlled at the speed of 3/16 of the clock CLK. In such a way, by forming a multi-stage prescaler, speed control becomes enabled with higher precision. In addition, by forming the multi-stage prescaler, it becomes easier to control different speeds on a resource-by resource basis.

Figure 10:
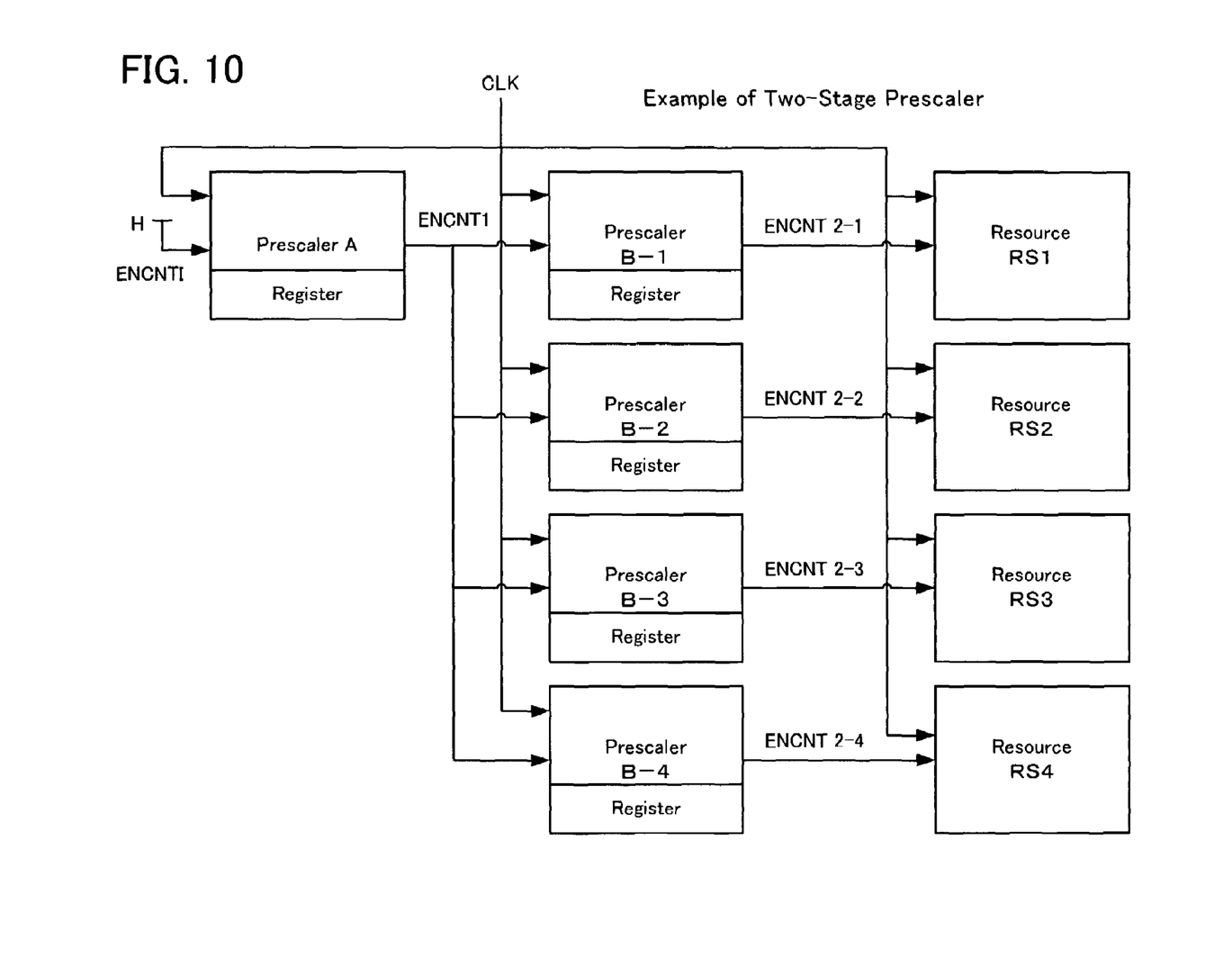
FIG. 10 shows a diagram illustrating a configuration example of a group of two-stage prescalers.

FIG. 10 shows a diagram illustrating a configuration example of a group of two-stage prescalers. In this example, different operation permission signals ENCNT2-1 to ENCNT2-4 are supplied to four resources RS1 to RS4 to be controlled. For this purpose, a prescaler A provided in the preceding stage generates operation permission signal ENCNT1 corresponding to the values n, m set in the built-in register of the prescaler A. Four prescalers B provided in the succeeding stage generates operation permission signals ENCNT2-1 to ENCNT2-4 corresponding to the values n, m independently set in the respective built-in registers of the prescalers B. The input operation permission signal ENCNTI being input to the first prescaler A is fixed to the H level, by which the first prescaler A is constantly set in operation condition.

When forming such a structure, desirably the operation control registers in the succeeding-stage prescalers B-1 to B-4 can be set to any one of the following three states: an operation state; an operation suspension state; and a state not using the operation permission signal supplied from the preceding stage. For example, the prescalers B-1, B-2 are set so as to operate only when the operation permission signal ENCNT1 of the preceding stage has the H level. As a result, these prescalers B-1, B-2 are affected by the operation speed control by the preceding-stage prescaler A. Namely, the operation of the prescalers B-1, B-2 becomes as shown in FIG. 9. Meanwhile, the prescaler B-3 is set to a state 'not using the operation permission signal supplied from the preceding stage'. As a result, this prescaler B-3 generates the operation permission signal ENCNT2-3 at the timing depending on only the setting values n and m being set in its built-in register. Further, the prescaler B-4 is set to the operation suspension state, and the operation permission signal ENCNT2-4 to be supplied to the resource RS4 is constantly set to the operation permission state. As a result, only the resource RS4 operates at the highest speed in synchronization with the clock CLK.

As shown in FIG. 10, the prescaler is formed of a multi-stage configuration, and each operation control register provided in the succeeding-stage prescaler B has three alterable states, namely the operation state; the operation suspension state; and the state not using the operation permission signal supplied from the preceding stage. With the structure described above, it becomes possible to control a variety of operation speeds against the plurality of resources. In other words, even the prescalers in the microcontroller have fixed hardware configurations, operation speeds of the internal resources as controlled objects can be changed flexibly by changing the settings of the built-in operation control registers provided in the prescalers.

In the above description of the embodiments of the present invention, the counter is taken as an example of the internal circuit in the internal resource. However, the internal circuit includes, for example, a frequency divider, and other circuits. In addition, another example of the internal resource includes a control clock generation circuit for the control of a display panel, etc.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A microcontroller operating in synchronization with a clock, comprising:
   an arithmetic unit operating in synchronization with the clock;
   an internal resource connected to the arithmetic unit via a bus, and having at least a bus interface and an internal circuit both of which operate in synchronization with the clock; and
   a system resource prescaler which generates, from the clock, an operation permission signal denoting an operation permission state in m cycles out of n cycles of the clock (m=<n), and supplies the operation permission signal to the internal circuit of the internal resource,
   wherein the internal circuit of the internal resource operates in synchronization with the clock when the operation permission signal denotes the operation permission state and the bus interface of the internal resource performs a bus management with the arithmetic unit in synchronization with the clock regardless of the state of the operation permission signal.

2. The microcontroller according to claim 1,
   wherein the internal resource includes a communication macro controlling communication with outside, and an internal circuit of the communication macro includes a counter which generates a communication control clock.

3. The microcontroller according to claim 1,
   wherein the internal resource comprises a pulse generation macro generating a control pulse, and an internal circuit of the pulse generation macro comprises a counter controlling a generation timing of the control pulse.

4. The microcontroller according to claim 1,
   wherein the system resource prescaler comprises a register storing the values m and n, and the register can be set alterably.

5. The microcontroller according to claim 4,
   wherein the system resource prescaler comprises a settable operation control register indicative of either a first operation state in which the operation permission signal is set constantly to the operation permission state or a second operation state in which the operation permission signal is set to the operation permission state in the m cycles out of the n cycles.

6. The microcontroller according to claim 1,
   wherein the system resource prescaler dispersively allocates the m cycles throughout the n cycles.

7. The microcontroller operating in synchronization with a clock, comprising:
   an arithmetic unit operating in synchronization with the clock;
   an internal resource being connected to the arithmetic unit via a bus, and having at least a bus interface and an internal circuit both of which operates in synchronization with the clock; and
   a system resource prescaler which generates, from the clock, an operation permission signal denoting an operation permission state in m cycles out of n cycles of the clock (m=<n), and supplies the operation permission signal to the internal circuit of the internal resource,
   wherein the internal circuit operates in synchronization with the clock when the operation permission signal denotes the operation permission state,
   wherein the system resource prescaler comprises a preceding-stage prescaler and a succeeding-stage prescaler which generates a succeeding-stage operation permission signal using a preceding-stage operation permission signal which is generated and supplied from the preceding-stage prescaler, and the succeeding-stage operation permission signal is supplied to the internal circuit of the internal resource.

8. The microcontroller according to claim 7,
   wherein the preceding-stage prescaler and the succeeding-stage prescaler respectively comprise registers storing the values m and n, and the registers can be set alterably.

9. The microcontroller according to claim 8,
   wherein the succeeding-stage prescaler further comprises an operation control register in which can be set any one of a first operation state enabling the succeeding-stage operation permission signal to be set constantly to an operation permission state, a second operation state enabling the succeeding-stage operation permission signal to be set to the operation permission state in the m cycles out of the n cycles, and a third state generating the succeeding-stage operation permission signal irrespective of the states of the preceding-stage operation permission signal.

10. A microcontroller operating in synchronization with a clock, comprising:
    an arithmetic unit operating in synchronization with the clock;
    an internal resource being connected to the arithmetic unit via a bus, and having at least a bus interface and an internal circuit both of which operate in synchronization with the clock; and
    a system resource prescaler which generates, from the clock, an operation permission signal having a lower frequency than the clock, and supplies the operation permission signal to the internal circuit of the internal resource,
    wherein the internal circuit of the internal resource operates in synchronization with the clock when the operation permission signal denotes the operation permission state and the bus interface of the internal resource performs a bus management with the arithmetic unit in synchronization with the clock regardless of the state of the operation permission signal.

11. The microcontroller according to claim 10,
    wherein the operation permission signal is controlled to be set to the operation permission state on a cycle-by-cycle basis of the clock.

12. The microcontroller according to claim 11,
    wherein the operation permission signal is set to the operation permission state in m cycles out of n cycles of the clock, and the values n and m can be set alterably.

* * * * *